3,217,003
METHOD FOR PREPARING TRIARYL ISOCYANURATES
Samuel E. Ellzey, Jr., and Charles H. Mack, New Orleans, La., assignors to the United States of America as represented by the Secretary of Agriculture
No Drawing. Filed Feb. 20, 1963, Ser. No. 260,084
11 Claims. (Cl. 260—248)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

The present invention relates to the preparation of triaryl isocyanurates and more particularly to a novel and improved method for the preparation of triaryl isocyanurates and substituted triaryl isocyanurates.

Triaryl isocyanurates and substituted triaryl isocyanurates are known compounds, and find utility in the polymer art as described in U.S. Patent 2,838,511, and as important chemical intermediates with excellent thermal stability. The alkyl substituted triaryl isocyanurates are easily oxidized to the carboxylic acid derivative which is useful in condensation polymerization to form polyester resins, particularly where cross-linking is desired. The unsubstituted triaryl isocyanurates can readily be nitrated or halogenated and the resulting compounds serve as intermediates in the preparation of triamines which are very suitable for further condensation in the preparation of polyurethane type isocyanate resins, since they give a cross-linking as well as a chain-extending effect.

It is the object of this invention to provide an improved method for producing triaryl isocyanurates and substituted triaryl isocyanurates. A further object is to provide a novel method for producing triaryl isocyanurates and substituted triaryl isocyanurates in the presence of a reducing agent.

The above and other objects will become apparent in the course of the following description and the appended claims.

The process of the present invention comprises the steps of reacting together an aryl isocyanate or a substituted aryl isocyanate and catalytic amounts of an alkali metal borohydride, an alkali metal aluminum hydride, or an alkali metal trialkoxyaluminohydride in an inert organic liquid medium suitable for bringing about mutual solubility of the reactants or without such liquid medium, at a temperature not to exceed 115° C., and recovering the triaryl isocyanurate or substituted triaryl isocyanurate by conventional dilution and filtration procedures.

Aryl isocyanates which may be used in the process of the invention may be generically represented by the formula

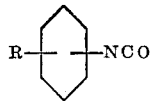

where R is H, an alkyl, aryl, or alkoxy group. Specific radicals encompassed within the above definition of R include methyl, methoxyl, and the like. Within the purview of the invention, the process may be carried out employing mixtures of isocyanates to prepare the mixed triaryl isocyanurates.

Catalysts which may be used in the process of the invention include alkali metal borohydrides such as sodium or potassium borohydride, alkali metal aluminum hydrides such as lithium aluminum hydride, alkali metal trialkoxyaluminohydrides such as lithium tri-tert-butoxyaluminohydride, or mixtures thereof. The amount of catalyst used is not critical. From 0.001 mole to 0.5 mole of the catalyst may be used per mole of the aryl isocyanate.

Inert organic liquid media which may be used in the process of the invention include cyclic and acylic ethers and more specifically, dioxane, the dimethyl ether of diethylene glycol or mixtures thereof, and the like. The reaction can be carried out without the addition of such liquid medium but in this case it is sometimes necessary to heat the reaction mixture to initiate the reaction.

It has been found, in accordance with the present invention, that when more than catalytic amounts of the catalyst are added to the aryl isocyanate, the production of the triaryl isocyanurate proceeds rapidly and normally regardless of the order of addition of the two reactants, provided the temperature of the reaction is not allowed to exceed about 115° C. This effect is completely unexpected when it is considered that at higher temperatures the aryl isocyanate is reduced to the N-methyl aryl amine with the alkali metal borohydride and that the amine results when an alkali metal aluminum hydride is used in refluxing ether.

The temperature and time of reaction can be varied depending for example, upon the particular reactants employed, the speed, and the extent of reaction wanted, provided temperatures not in excess of 115° C. are used. It is generally preferred to carry out the reaction at a temperature between about 3° C. and about 115° C. As stated above, higher temperatures will lead to other undesirable products and lower temperatures are not generally desirable for practical operation. Reaction times of one hour or less are preferable.

The following examples illustrate the improved method for the preparation of triaryl isocyanurates and substituted triaryl isocyanurates in accordance with the invention but are not to be construed as defining the limits of the invention.

*Example 1*

To a solution of 11.91 g. (0.1 mole) of phenyl isocyanate in 25 ml. of purified dimethyl ether of diethylene glycol was added with stirring a slurry of 1.89 g. (0.05 mole) of purified sodium borohydride in 20 ml. of the dimethyl ether of diethylene glycol, while protecting the reaction mixture with a calcium chloride drying tube. The first few drops of the borohydride slurry caused the temperature to rise to about 60° C. and upon cooling the mixture in an ice bath a white solid precipitated. Addition of the remaining sodium borohydride over a 15 minute period caused a further slight rise in temperature.

The reaction mixture was then poured onto 100 g. of cracked ice and carefully acidified with a solution of 10 ml. of glacial acetic acid in 40 ml. of water. The white solid was filtered, washed with water, dried, and recrystallized from 95% ethanol. The first crop of white needles of triphenyl isocyanurate weighed 6.79 g. and had a melting point of 277–278° C. Evaporation of the filtrate gave a further 1.44 g. of triphenyl isocyanurate, melting point 277–278° C. The total yield of product was 69%. A mixture melting point with an authentic sample of triphenyl isocyanurate was 278–279° C. The infrared spectrum was identical to that of an authentic sample.

*Example 2*

A trimerization employing the same reactants in the same proportion was carried out under the same conditions as in Example 1 except that the phenyl isocyanate solution was added to the sodium borohydride slurry and the reaction temperature was maintained at 30–35° C. The recovered triphenyl isocyanurate weighed 6.56 g., representing a 55% yield. Recrystallization from methylene chloride-petroleum either yielded 3.98 g. of triphenyl isocyanurate, melting point 276–278° C.

*Example 3*

To a solution of 6.0 g. (0.05 mole) of phenyl isocyanate (protected by a calcium chloride tube) in 20 ml. of purified dioxane cooled to 3° C. in an ice bath was added one ml. of sodium borohydride solution (0.38 g. in 20 ml. of the dimethyl ether of diethylene glycol) (0.0005 mole). Within 2 minutes the temperature rose to 15° C. and white needles began to precipitate. Stirring was continued in an ice bath for 15 minutes before the addition of 50 ml. of ether. The triphenyl isocyanurate was filtered, washed with ether, dried, and weighed 5.03 g., representing an 83% yield. It was melted at 279–280° C. and after recrystallization from methylene chloride-petroleum ether 4.03 g. of product, melting point 280–281° C., was obtained.

*Example 4*

To a solution of 6.0 g. (0.05 mole) of phenyl isocyanate in 20 ml. of dioxane was added 0.1 ml. (0.05 mmole) of the catalyst solution used in Example 3. No precipitate formed after the solution was kept at 30° C. for 15 minutes, but upon heating to 70° and maintaining that temperature for 45 minutes the reaction was complete. After cooling to 10° C. the mixture was treated with 50 ml. of ether and the solid was filtered and washed with ether. The yield of triphenyl isocyanurate was 5.58 g. (93%). The melting point of the crystals was 277° C.

*Example 5*

To 2.95 g. (0.025 mole) of phenyl isocyanate at 27° C. in a flask protected by a calcium chloride tube was added 10 mg. (0.26 mmole) of solid sodium borohydride. No temperature rise was noted upon stirring the mixture for 30 minutes, nor after heating for 10 minutes at 45° C. When the mixture was heated to 70° C. an exothermic reaction began and the temperature rapidly rose to 110° C. as the mixture solidified. After cooling in an ice bath, 10 ml. of ether was added and the solid was filtered and washed with ether. The weight of crude triphenyl isocyanurate was 2.43 g., representing a yield of 82%. Recrystallization from methylene chloride-petroleum ether gave 2.20 g. (74% yield) of product melting at 280–281° C.

*Example 6*

A trimerization employing phenyl isocyanate was carried out under the same conditions as in Example 5 except that 65 mg. (0.26 mmole) of lithium tri-tert-butoxyaluminohydride was substituted for the sodium borohydride and the temperature of the reaction mixture rose to 95° C. without external heating. The recrystallized triphenyl isocyanurate was obtained in 84% yield.

*Example 7*

A trimerization employing phenyl isocyanate was carried out under the same conditions as in Example 5 except that 15 mg. (0.28 mmole) of potassium borohydride was substituted for the sodium borohydride. No temperature rise occurred during the first 30 minutes while stirring at 25° C. After warming to 45° C. no rise in temperature was noted, but when the reaction mixture was warmed to 80° C., the temperature rapidly rose to 115° C. as a white solid formed. The recrystallized triphenyl isocyanurate was obtained in 74% yield.

*Example 8*

A trimerization employing phenyl isocyanate was carried out under the same conditions as in Example 5 except that 10 mg. (0.26 mmole) of lithium aluminum hydride was substituted for the sodium borohydride and the temperature of the reaction mixture rapidly rose to 75° C. without external heating as a white solid precipitated. The recrystallized triphenyl isocyanurate was obtained in 78% yield.

*Example 9*

To a solution of 6.65 g. (0.05 mole) of p-tolyl isocyanate in 20 ml. of dioxane at 25° C. was added one ml. or sodium borohydride solution (0.38 g. in 20 ml. of the dimethyl ether of diethylene glyocl) (0.0005 mole) with stirring. The solution was protected by a calcium chloride tube during the reaction. The temperature rose to 30° C. upon mixing and then to 45° C. within 10 minutes as a white precipitate formed. The slurry was stirred for 30 minutes as the temperature fell, after which 50 ml. of ether was added. The precipitate was filtered and washed with ether. The weight of tri-p-tolyl isocyanurate was 6.07 g., representing a 91% yield, melting point 268–269° C. A mixture melting point with an authentic sample was 268–269° C. After recrystallization from methylene chloride-petroleum either 4.10 g. of product was obtained. The infrared spectrum was identical with that of an authentic sample.

*Example 10*

To a solution of 7.45 g. (0.05 mole) of p-methoxyphenyl isocyanate in 20 ml. of dioxane at 30° C. was added one ml. of sodium borohydride solution (0.38 g. in 20 ml. of the dimethyl ether of diethylene glycol) (0.0005 mole) with stirring. The solution was protected by a calcium chloride tube during the reaction. The temperature slowly rose to 35° C. at about 5 minutes, after which it rapidly rose to 53° C. as a white precipitate formed. The slurry was stirred for 30 minutes as the temperature dropped to 30° C. After the addition of 50 ml. of ether the precipitate was filtered, washed with ether, and dried. The weight of the crude product was 7.30 g., melting at 250–260° C. Recrystallization from methylene chloride-petroleum either yielded 6.40 g. of tri-p-methoxyphenyl isocyanurate, representing an 86% yield, melting point 263–264° C. A mixture melting point with an authentic sample was 262–263° C. The infrared spectrum of a sample recrystallized from ethanol was identical with that of an authentic sample.

We claim:

1. A process for preparing a triaryl isocyanurate comprising trimerizing an aryl isocyanate of the formula

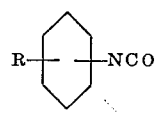

wherein R is H, alkyl, aryl, and alkoxy, in the presence of a catalytic amount of about from 0.0001 mole to 0.5 mole of a hydride selected from the group consisting of an alkali metal borohydride, an alkali metal aluminum hydride, an alkali metal trialkoxyaluminohydride, and mixtures thereof, per mole of the aryl isocyanate at a temperature not exceeding 115° C.

2. The process of claim 1 wherein R is hydrogen.
3. The process of claim 1 wherein the alkyl is methyl.
4. The process of claim 1 wherein the alkoxy is methoxy.
5. The process of claim 1 wherein the alkali metal borohydride is sodium borohydride.
6. The process of claim 1 wherein the alkali metal aluminum hydride is lithium aluminum hydride.
7. The process of claim 1 wherein the alkali metal trialkoxyaluminohydride is lithium tri-tert-butoxyaluminohydride.
8. The process of claim 1 wherein the trimerazation is carried out in an inert organic liquid medium.
9. The process of claim 8 wherein the inert organic liquid medium is dioxane.
10. The process of claim 8 wherein the inert organic liquid medium is the dimethyl ether of diethylene glycol.
11. The process of claim 8 wherein the inert organic lquid medium is a mixture of dioxane and the dimethyl ether of diethylene glycol.

References Cited by the Examiner

Ried et al.: Chem. Ber., vol. 85, pages 470–471 (1952).

WALTER A. MODANCE, *Primary Examiner.*

JOHN D. RANDOLPH, *Examiner.*